United States Patent
Choi et al.

(10) Patent No.: US 7,913,586 B2
(45) Date of Patent: Mar. 29, 2011

(54) STEERING WHEEL FOR VEHICLE

(75) Inventors: Changmoo Choi, Seongnam-si (KR); Byungwoo Noh, Seoul (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 12/276,165

(22) Filed: Nov. 21, 2008

(65) Prior Publication Data
US 2009/0255366 A1 Oct. 15, 2009

(30) Foreign Application Priority Data
Apr. 10, 2008 (KR) .................. 10-2008-0033140

(51) Int. Cl.
*B62D 1/04* (2006.01)
(52) U.S. Cl. ........................................... 74/552
(58) Field of Classification Search ............... 74/552; 280/728.1, 731
See application file for complete search history.

(56) References Cited

U.S. PATENT DOCUMENTS

| | | | |
|---|---|---|---|
| 4,712,446 A * | 12/1987 | Kamata et al. ............... | 74/492 |
| 6,125,716 A * | 10/2000 | Hosoi et al. ............... | 74/552 |
| 6,874,386 B2 * | 4/2005 | Xu et al. ............... | 74/552 |

FOREIGN PATENT DOCUMENTS

| | | |
|---|---|---|
| JP | 2003-200805 A | 7/2003 |
| JP | 2006-175890 A | 7/2006 |
| JP | 2006-205890 A | 8/2006 |
| KR | 10-0306884 B1 | 9/2001 |

* cited by examiner

*Primary Examiner* — Vicky A Johnson
(74) *Attorney, Agent, or Firm* — Morgan, Lewis & Bockius LLP

(57) ABSTRACT

A steering wheel for a vehicle has a gap formed between a spoke and airbag cover that can be maintained as small as possible regardless of a hot blast process of a steering wheel. The steering wheel may include an armature member that connects a rim and a hub, an intermediate structure that overlaps and is fixed to the armature member and includes a groove at an end thereof facing an airbag cover, a reinforcement member that is fitted to the groove of the intermediate structure, and/or a cover that includes the reinforcement member, and is fixed to the intermediate structure and the reinforcement member so as to cover the intermediate structure.

17 Claims, 9 Drawing Sheets

STEERING WHEEL FOR VEHICLE

CROSS-REFERENCE TO RELATED APPLICATION

The present application claims priority to Korean Application Number 10-2008-0033140, filed on Apr. 10, 2008, the entire contents of which is incorporated herein for all purposes by this reference.

BACKGROUND OF THE INVENTION

1. Field of the Invention

The present invention relates to a steering wheel for a vehicle that maintains a gap between a spoke and an airbag cover as small as possible when an airbag module for a driver is mounted on a steering wheel.

2. Description of Related Art

In general, a driver directly operates a steering wheel 1 to turn a vehicle. As shown in FIG. 1, the steering wheel includes a rim 10 that is formed at an outer peripheral portion, a hub 20 that is formed at a central portion, and a plurality of spokes 30 that connect hub 20 with rim 10.

A horn operation device and an airbag module for a driver are mounted on hub 20. The airbag module for a driver is covered with an airbag cover 40, which is fitted to hub 20, not to be exposed to the outside.

Meanwhile, due to the characteristics of an assembling structure of airbag cover 40, a predetermined gap G1 is formed between spoke 30 and airbag cover 40 as shown in FIG. 2.

It is preferable that gap G1 be as small as possible in consideration of appearance. After spokes 30 are completely manufactured, the gap of steering wheel 1 in the related art is increased as shown in FIG. 3, so that appearance quality deteriorates. For this reason, there is a problem in that customer complaints are increased.

That is, as shown in FIG. 2, each of spoke 30 of steering wheel 1 includes an armature member 31 that connects rim 10 with hub 20 and serves as a frame, an intermediate structure 32 that overlaps and is fixed to armature member 31, and a cover 33 that surrounds intermediate structure 32 and is fixed to the intermediate structure 32.

Armature member 31 is made of magnesium, and cover 33 is made of leather.

Furthermore, intermediate structure 32 includes a first intermediate member 321 that is made of polyurethane and overlaps and is fixed to armature member 31, and a second intermediate member 322 that is made of expanded polystyrene and overlaps and is fixed to first intermediate member 321.

In this case, first intermediate member 321 is hard, and second intermediate member 322 is soft.

After spokes 30 are completely assembled using the above-mentioned structure, steering wheel 1 is subject to a hot blast process that is a post-process and removes wrinkles of cover 33.

In the hot blast process, hot air of which temperature is in the range of 70 to 80° C. is applied to spokes 30 for a predetermined time in order to remove wrinkles of cover 33.

However, after steering wheel 1 is subject to the hot blast process as described above, cover 33 grows longer and the edge of soft second intermediate member 322 facing airbag cover 40 is deformed as shown in FIG. 3.

As a result, the gap formed between spoke 30 and airbag cover 40 is increased from a gap G1 (see FIG. 2) formed when a hot blast process is not performed, to a gap G2 (see FIG. 3) after a hot blast process is performed. Accordingly, there is a problem in that appearance quality deteriorates and customer complaints are increased.

The following structure has been proposed to prevent this. That is, as shown in FIG. 4, a protrusion 321a is integrally formed with the first intermediate member so as to protrude upward from an end of first intermediate member 321 facing airbag cover 40, and the second intermediate member is fitted to first intermediate member 321 so that an end of second intermediate member 322 comes in contact with protrusion 321a.

The structure of FIG. 4 is proposed to prevent the edge of soft second intermediate member 322 from being deformed due to the hot blast process. When steering wheel 1 having the structure of FIG. 4 is deformed as shown in FIG. 5 due to a hot blast process, a gap G3 formed between spoke 30 and airbag cover 40 is significantly decreased due to hard first intermediate member 321 as compared to gap G2 of FIG. 3 in the related art. However, there is a problem in that gap G3 is still larger than gap G1 of FIG. 4 when a hot blast process is not performed.

That is, even though being made of hard polyurethane, first intermediate member 321 is deformed due to shrink of cover 33 which is made of leather during a hot blast process. For this reason, if heat is applied to the first intermediate member during the hot blast process, the edge of the first intermediate member facing airbag cover 40 is deformed. Accordingly, the gap formed between spoke 30 and airbag cover 40 becomes larger after the hot blast process as compared to before the hot blast process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steering wheel for a vehicle, which includes a reinforcement member of which the outward form is not changed by heat so that a gap formed between a spoke and an airbag cover can be always maintained as small as possible regardless of a hot blast process of a steering wheel, thereby improving appearance quality and merchantability of a vehicle.

Various aspects of the present invention are directed to a steering wheel for a vehicle including an armature member that interconnects a rim and a hub, an intermediate structure that overlaps and is fixed to the armature member, and may include a groove at an end thereof facing an airbag cover, a reinforcement member that is fitted to the groove of the intermediate structure, and/or a cover fixed to the intermediate structure and the reinforcement member so as to cover the intermediate structure.

The intermediate structure may include a first intermediate member that may overlap and may be fixed to the armature member, and a second intermediate member displaced under and fixed to the cover and may overlap and may be fixed to the first intermediate member. The groove may be formed by cutting an upper edge of the second intermediate member so as to have an L-shaped cross section. A plurality of fitting grooves may be formed in the groove, fitting protrusions press-fitted to the fitting grooves may be formed on the reinforcement member, and the fitting protrusions may be fitted to the fitting grooves so that the reinforcement member may be fitted to the groove. The reinforcement member may be fitted to the groove with an adhesive member interposed therebetween.

The groove may be formed by fully cutting an end portion of the second intermediate member to the upper surface of the first intermediate member in a traverse direction of the intermediate member. A plurality of fitting grooves may be formed in the groove, fitting protrusions press-fitted to the fitting grooves may be formed on the reinforcement member, and the fitting protrusions may be fitted to the fitting grooves so that the reinforcement member may be fitted to the groove. The reinforcement member may be fitted to the groove with an adhesive member interposed therebetween.

The groove may be formed by fully cutting end portion of the second intermediate member and cutting an upper edge of the first intermediate member in a traverse direction of the intermediate member so as to have an L-shaped cross section. A plurality of fitting grooves may be formed in the groove, fitting protrusions press-fitted to the fitting grooves may be formed on the reinforcement member, and the fitting protrusions may be fitted to the fitting grooves so that the reinforcement member may be fitted to the groove. The reinforcement member may be fitted to the groove with an adhesive member interposed therebetween.

The groove may be formed by fully cutting end portions of the second and first intermediate members to the upper surface of the armature member in a traverse direction of the intermediate member. A plurality of fitting grooves may be formed in the groove, fitting protrusions press-fitted to the fitting grooves may be formed on the reinforcement member, and the fitting protrusions may be fitted to the fitting grooves so that the reinforcement member may be fitted to the groove. The reinforcement member may be fitted to the groove with an adhesive member interposed therebetween.

The groove may be formed by fully cutting end portions of the second and first intermediate members and cutting a portion of an upper surface of the armature member in a traverse direction of the intermediate member. A plurality of fitting grooves may be formed in the groove, fitting protrusions press-fitted to the fitting grooves may be formed on the reinforcement member, and the fitting protrusions may be fitted to the fitting grooves so that the reinforcement member may be fitted to the groove. The reinforcement member may be fitted to the groove with an adhesive member interposed therebetween.

A passenger vehicle may include any of the above-mentioned steering wheels. The intermediate structure may include a first intermediate member that overlaps and may be fixed to the armature member, and a second intermediate member that overlaps and may be fixed to the first intermediate member.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a cross-sectional view taken along line II-II of FIG. 1.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
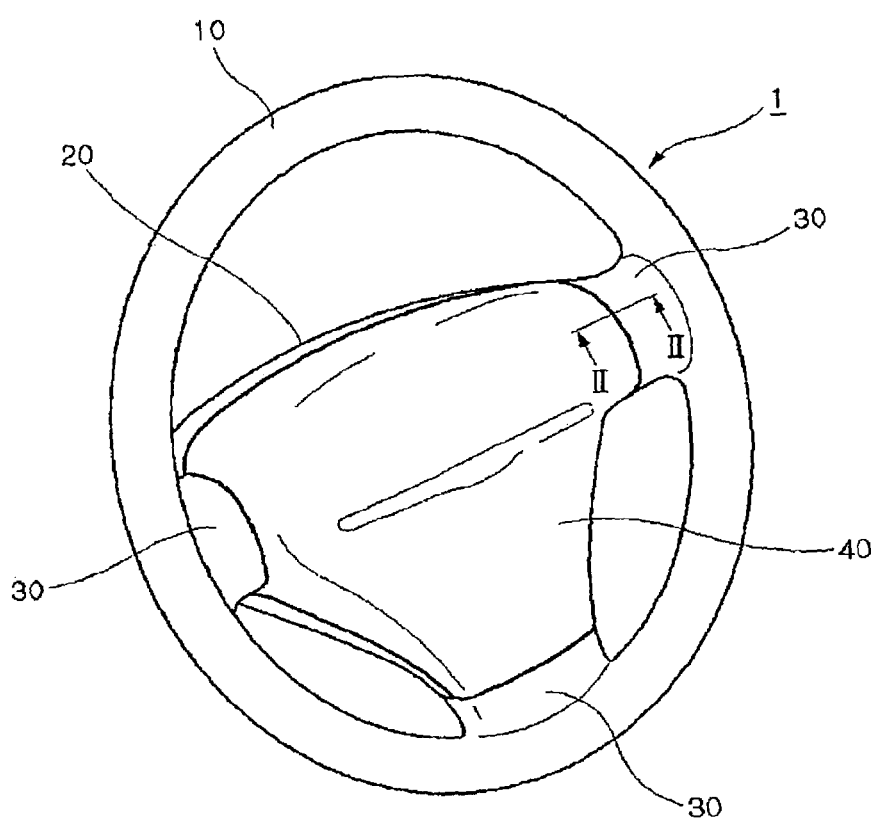
FIG. 1 is a perspective view showing the appearance of a steering wheel.
Figure 2:
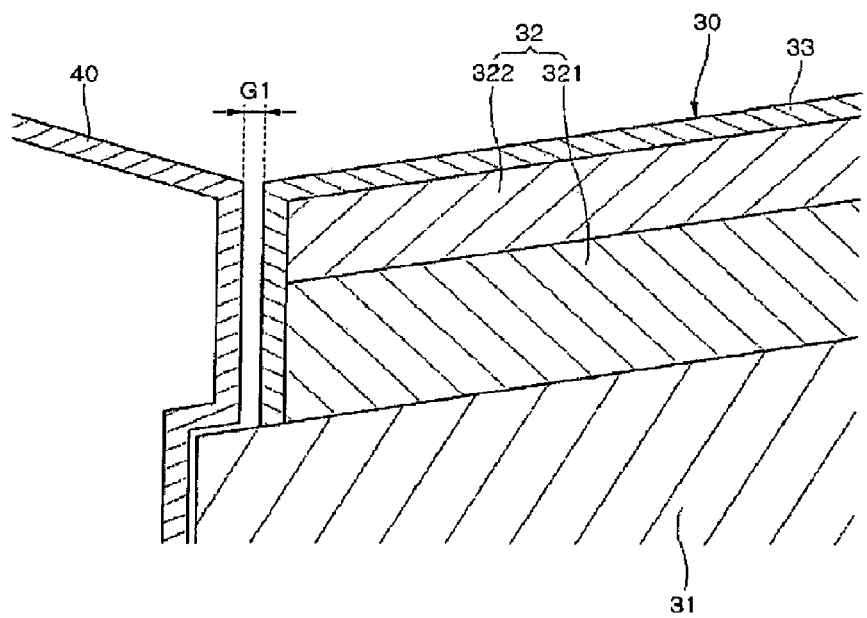
FIGS. 2 to 5 are views showing the structure of conventional steering wheels.
Figure 3:
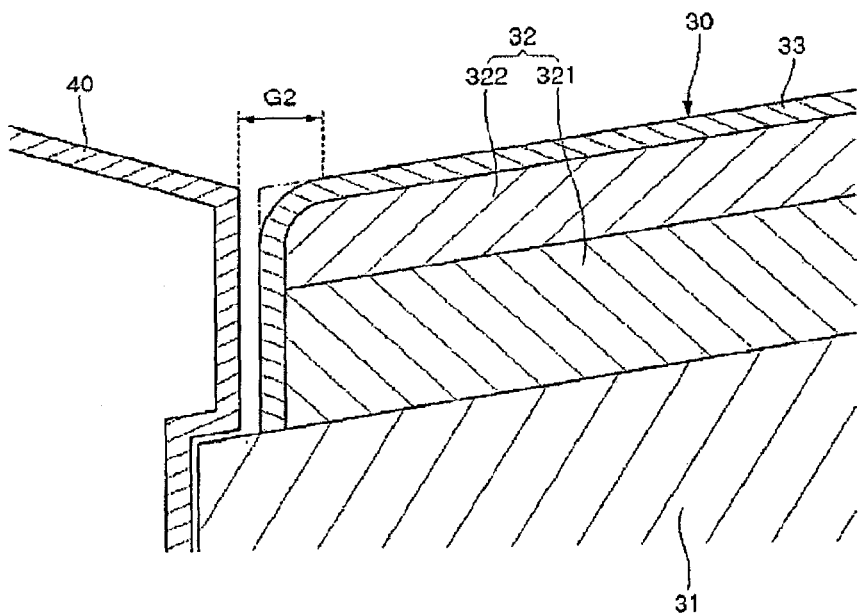
Figure 4:
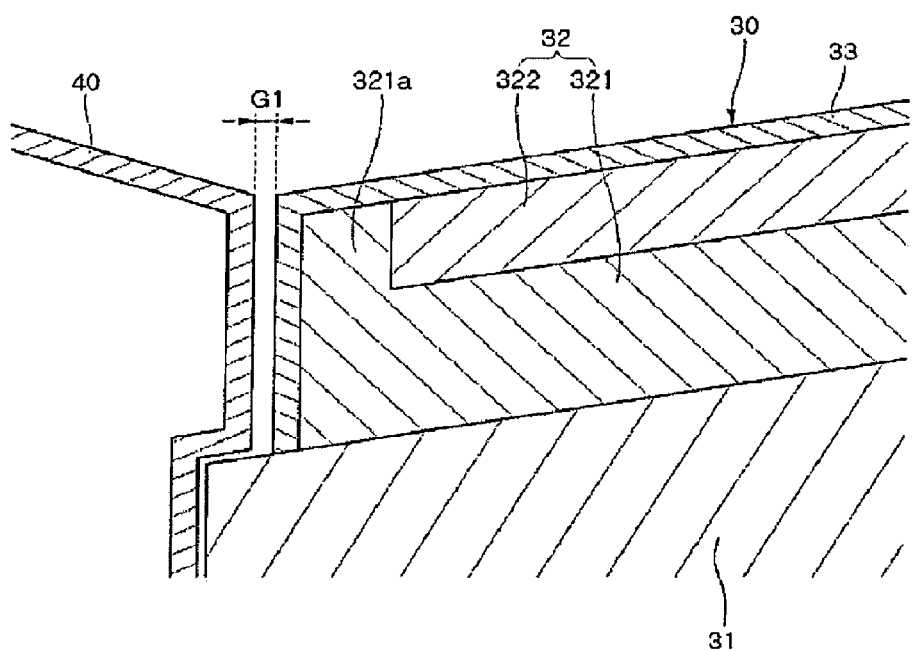
Figure 5:
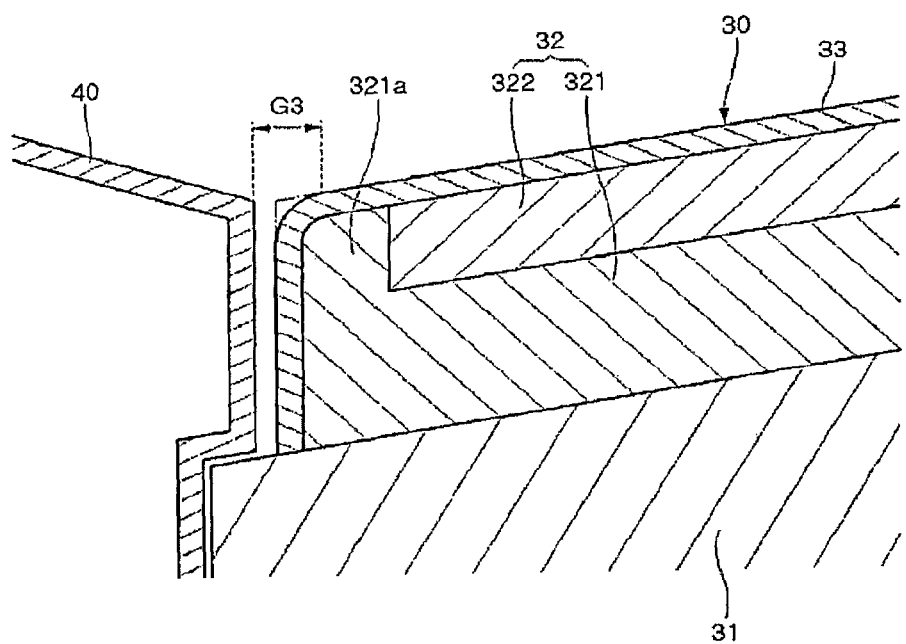

As described with reference to FIG. 1, a steering wheel 1 according to various aspects of the present invention includes a rim 10 that is formed at an outer peripheral portion, a hub 20 that is formed at a central portion, and a plurality of spokes 30 that connects hub 20 with rim 10.

A horn operation device and an airbag module for a driver are mounted on hub 20. The airbag module for a driver is covered with an airbag cover 40, which is fitted to hub 20, not to be exposed to the outside.

Figure 6:
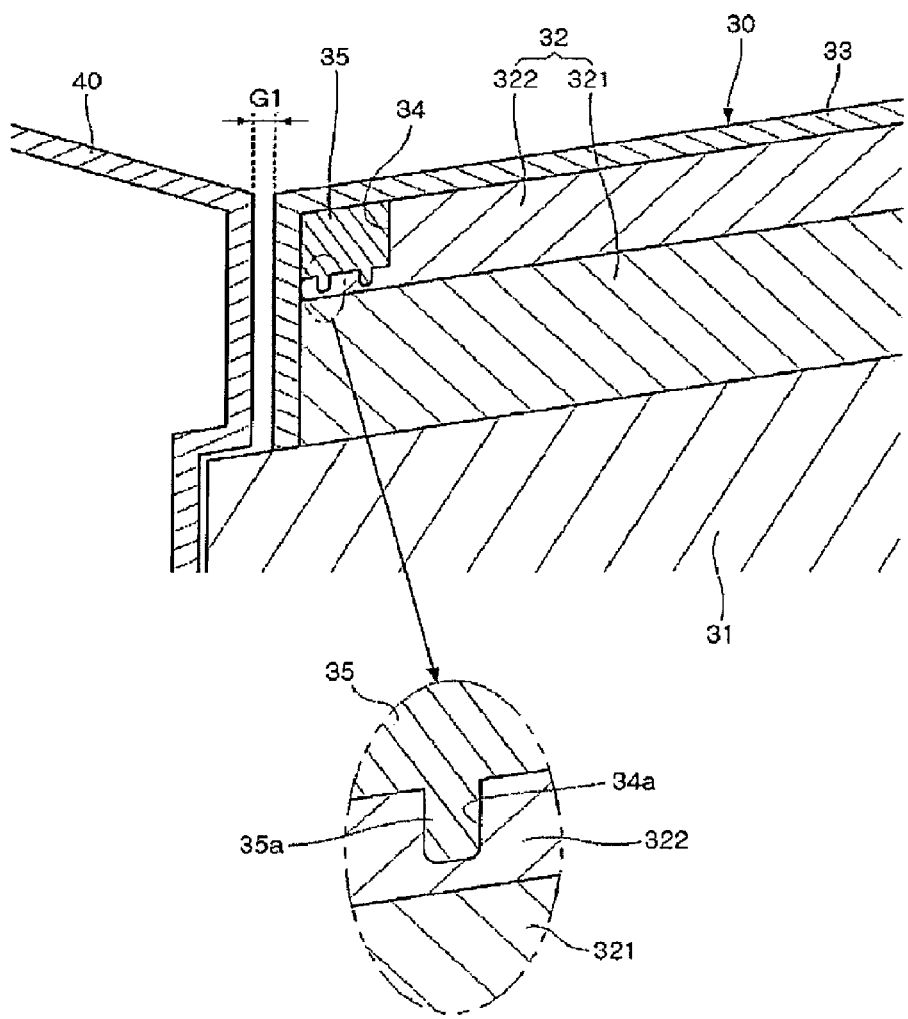
FIGS. 6 to 9 are views showing an exemplary structure of steering wheels including reinforcement members according to various aspects of the present invention.

Meanwhile, due to the characteristics of an assembling structure of airbag cover 40, a predetermined gap G1 is formed between spoke 30 and airbag cover 40 as shown in FIG. 6. It is preferable that gap G1 be as small as possible in consideration of appearance.

According to the embodiment of the present invention, gap G1 formed between spoke 30 and airbag cover 40 is not changed even though steering wheel 1 is subject to a hot blast process.

For this purpose, as shown in FIG. 6, each of spokes 30 according to the present invention includes an armature member 31 that connects rim 10 with hub 20 and serves as a frame, an intermediate structure 32 that overlaps and is fixed to armature member 31, and a cover 33 that surrounds intermediate structure 32 and is fixed to the intermediate structure 32.

Armature member 31 is made of magnesium, and cover 33 is made of leather.

Furthermore, intermediate structure 32 includes a first intermediate member 321 that is made of polyurethane and overlaps and is fixed to armature member 31, and a second intermediate member 322 that is made of expanded polystyrene and overlaps and is fixed to first intermediate member 321.

In this case, first intermediate member 321 is hard, and second intermediate member 322 is soft.

A case where intermediate structure 32 includes first and second intermediate members 321 and 322 is exemplified in the embodiment of the present invention. However, the intermediate structure may be formed of a single member. Therefore, it is not preferable that the intermediate structure be limited to any one case.

However, for convenience, only the case where intermediate structure 32 includes first and second intermediate members 321 and 322 will be described for each embodiment with reference to FIGS. 6 to 9.

First, in FIG. 6, an upper edge of second intermediate member 322 facing airbag cover 40 is cut to have an L-shaped cross section so that a groove 34 is formed. Then, a reinforcement member 35, which has large impact resistance and excellent heat resistance and abrasion resistance, is fitted to groove 34.

Reinforcement member 35 is preferably made of an ABS (acrylonitrile butadiene styrene) resin or a PP (polypropylene) resin of which the outward configuration is not changed by heat even though steering wheel 1 is subject to a hot blast process. However, the reinforcement member is not limited thereto.

Figure 7:
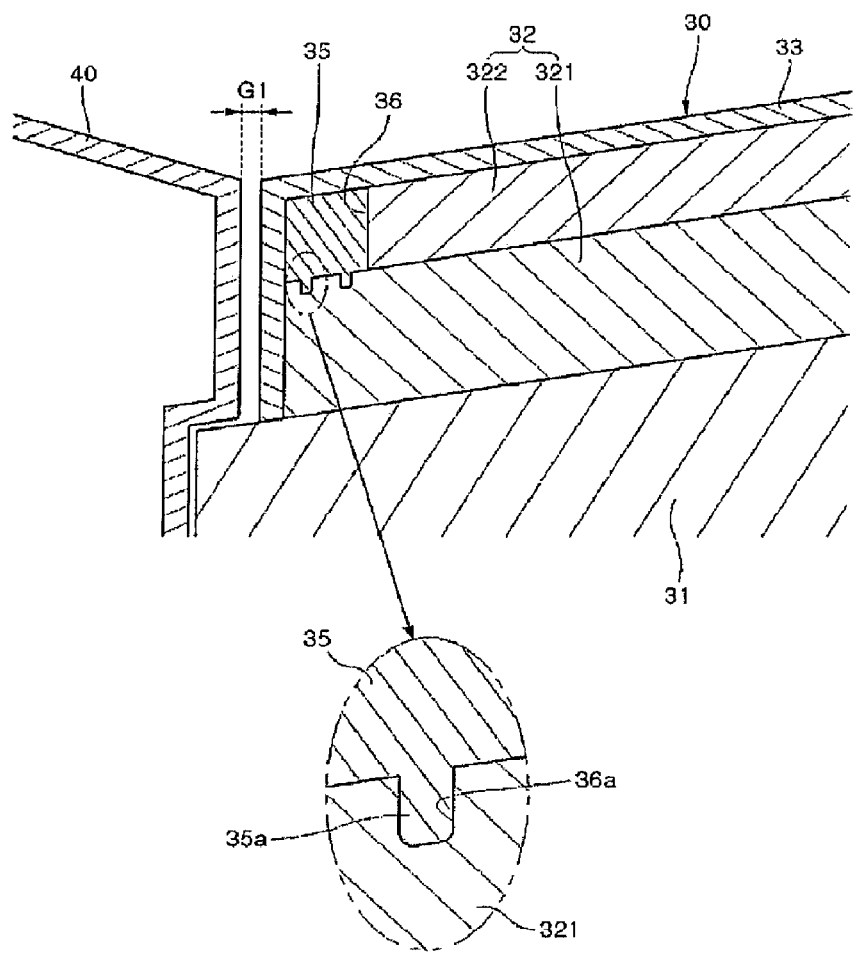
Figure 8:
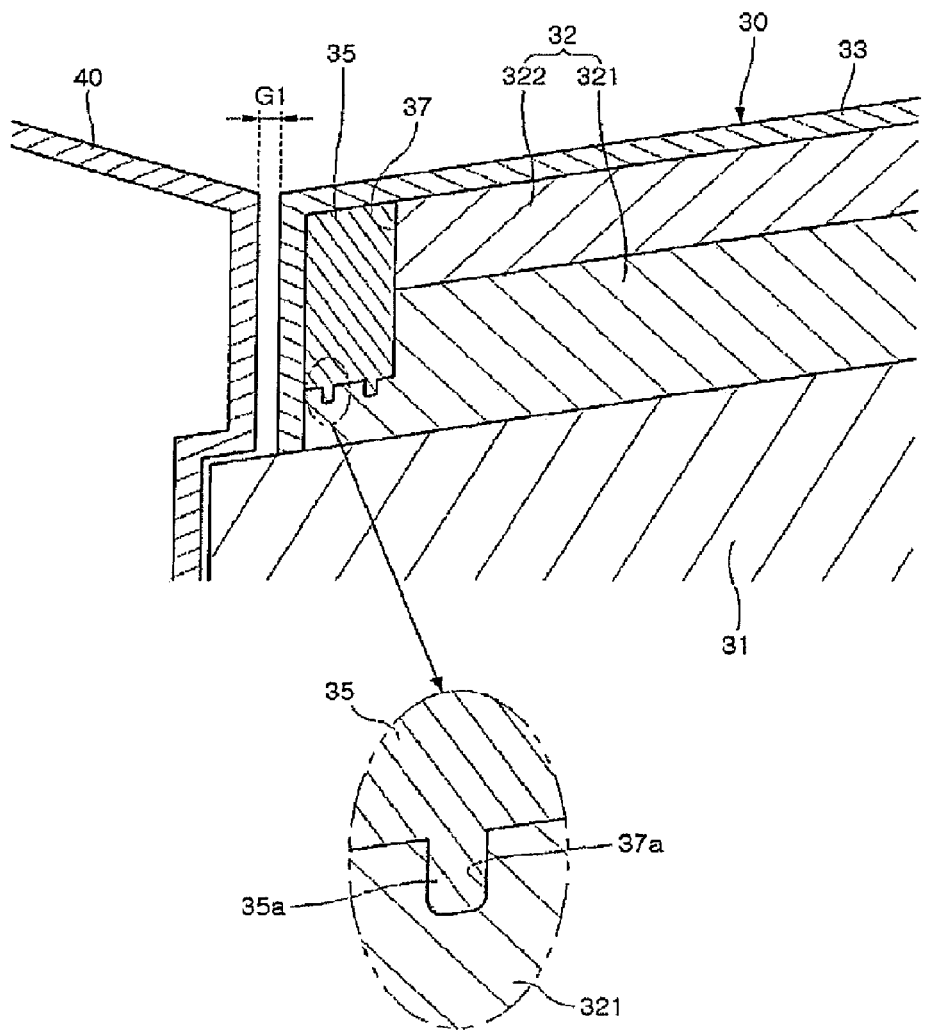
Figure 9:
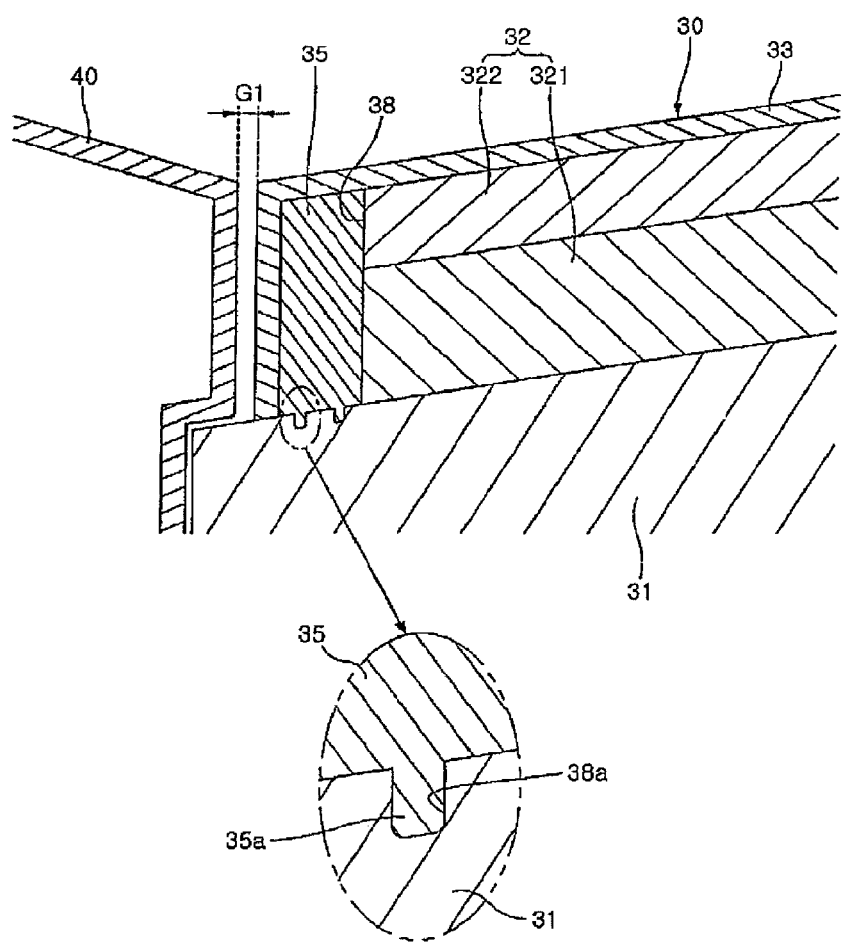

Furthermore, reinforcement member 35 will be indicated by the same reference numeral even in FIGS. 7 to 9.

Reinforcement member 35 is fitted to groove 34 using the structure where fitting protrusions 35a formed on lower portion of the reinforcement member 35 are fitted to fitting grooves 34a formed at the second intermediate member 322.

That is, a plurality of fitting grooves 34a is formed in groove 34, and fitting protrusions 35a press-fitted to fitting grooves 34a are formed on reinforcement member 35. Fitting protrusions 35a are press-fitted to fitting grooves 34a, so that reinforcement member 35 is fitted to groove 34.

In this case, fitting grooves 34a are formed within second intermediate member 322.

Furthermore, reinforcement member 35 may be fitted to groove 34 with an adhesive member, such as an adhesive or a double-sided adhesive tape, interposed therebetween. In an exemplary embodiment of the present invention, fitting grooves 34a may not be formed in groove 34, and fitting protrusions 35a may not be formed on reinforcement member 35 to apply the adhesive member.

The structure where reinforcement member 35 is fitted to groove 34 with the adhesive member interposed therebetween will also be applied likewise to embodiments shown in FIGS. 7 to 9. For this reason, the above-mentioned structure will be omitted in the following description.

In FIG. 7, an upper edge of second intermediate member 322 facing airbag cover 40 is cut to the upper surface of first intermediate member 321 in a traverse direction of the intermediate member 32 so that a groove 36 is formed. Then, a reinforcement member 35 is fitted to groove 36.

If reinforcement member 35 is fitted to groove 36 using the structure where fitting protrusions 35a are fitted to fitting grooves 36a, fitting grooves 36a are formed within first intermediate member 321.

In FIG. 8, an end portion of second intermediate member 322 facing airbag cover 40 and an upper edge of first intermediate member 321 are cut to have an L-shaped cross section so that a groove 37 is formed. Then, a reinforcement member 35 is fitted to groove 37.

If reinforcement member 35 is fitted to groove 37 using the structure where fitting protrusions 35a formed on lower portion of the reinforcement member 35 are fitted to fitting grooves 37a, fitting grooves 37a are formed within first intermediate member 321.

In FIG. 9, end portions of first and second intermediate members 321 and 322 facing airbag cover 40 are cut to the upper surface of armature member 31 in a traverse direction of the intermediate member 32 so that a groove 38 enclosed by the first intermediate member 321, the second intermediate member 322, and the armature member 31 is formed. Then, a reinforcement member 35 is fitted to groove 38.

If reinforcement member 35 is fitted to groove 38 with the structure where fitting protrusions 35a formed on lower portion of the reinforcement member 35 are fitted to fitting grooves 38a, fitting grooves 38a are formed within armature member 31.

In further another embodiment of the present invention, end portions of first and second intermediate members 321 and 322 facing airbag cover 40 in FIG. 9 are cut to the upper surface of armature member 31 in a traverse direction of the intermediate member 32. Moreover, a portion of the upper surface of the armature member 31 may be cut so that the groove 38 of FIG. 9 may extend into the armature member 31.

After spokes 30 are completely assembled using the above-mentioned structure, steering wheel 1 is subject to a hot blast process that is a post-process and removes wrinkles of cover 33.

In the hot blast process, hot air of which temperature is in the range of 70 to 80□C is applied to spokes 30 for a predetermined time in order to remove wrinkles of cover 33.

As described above, reinforcement member 35, which has large impact resistance and excellent heat resistance and abrasion resistance, is fitted to the edge of intermediate structure 32 facing airbag cover 40. Cover 33 is fitted to the surface of intermediate structure 32 including reinforcement member 35. Then, steering wheel 1 is subject to a hot blast process that is a post-process and removes wrinkles of cover 33.

In this configuration of the present invention, gap G1 formed between spoke 30 and airbag cover 40 is not changed even though steering wheel 1 is subject to the hot blast process. This is due to reinforcement member 35 of which the outward form is not changed by heat even though wrinkles are smoothed out while cover 33 grows longer due to heat.

Therefore, according to the embodiments of the present invention, a gap G1 formed between spoke 30 and airbag cover 40 can be always maintained as small as possible regardless of a hot blast process of steering wheel 1. Therefore, it is possible to improve appearance quality. As a result, it is possible to obtain advantages of improving the merchantability and image of a vehicle.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering wheel for a vehicle comprising:
   an armature member that interconnects a rim and a hub;
   an intermediate structure that overlaps and is fixed to the armature member, and includes a groove at an end thereof facing an airbag cover;
   a reinforcement member that is fitted to the groove of the intermediate structure; and
   a cover fixed to the intermediate structure and the reinforcement member so as to cover the intermediate structure;
   wherein the intermediate structure includes:
      a first intermediate member that overlaps and is fixed to the armature member; and a second intermediate member displaced under and fixed to the cover and overlaps and is fixed to the first intermediate member.

2. The steering wheel as defined in claim 1, wherein the groove is formed by cutting an upper edge of the second intermediate member so as to have an L-shaped cross section.

3. The steering wheel as defined in claim 2, wherein a plurality of fitting grooves is formed in the groove, fitting protrusions press-fitted to the fitting grooves are formed on the reinforcement member, and the fitting protrusions are fitted to the fitting grooves so that the reinforcement member is fitted to the groove.

4. The steering wheel as defined in claim 2, wherein the reinforcement member is fitted to the groove with an adhesive member interposed therebetween.

5. The steering wheel as defined in claim 1, wherein the groove is formed by fully cutting an end portion of the second intermediate member to the upper surface of the first intermediate member in a traverse direction of the intermediate member.

6. The steering wheel as defined in claim 5, wherein a plurality of fitting grooves is formed in the groove, fitting protrusions press-fitted to the fitting grooves are formed on the reinforcement member, and the fitting protrusions are fitted to the fitting grooves so that the reinforcement member is fitted to the groove.

7. The steering wheel as defined in claim 5, wherein the reinforcement member is fitted to the groove with an adhesive member interposed therebetween.

8. The steering wheel as defined in claim 1, wherein the groove is formed by fully cutting end portion of the second intermediate member and cutting an upper edge of the first intermediate member in a traverse direction of the intermediate member so as to have an L-shaped cross section.

9. The steering wheel as defined in claim 8, wherein a plurality of fitting grooves is formed in the groove, fitting protrusions press-fitted to the fitting grooves are formed on the reinforcement member, and the fitting protrusions are fitted to the fitting grooves so that the reinforcement member is fitted to the groove.

10. The steering wheel as defined in claim 8, wherein the reinforcement member is fitted to the groove with an adhesive member interposed therebetween.

11. The steering wheel as defined in claim 1, wherein the groove is formed by fully cutting end portions of the second and first intermediate members to the upper surface of the armature member in a traverse direction of the intermediate member.

12. The steering wheel as defined in claim 11, wherein a plurality of fitting grooves is formed in the groove, fitting protrusions press-fitted to the fitting grooves are formed on the reinforcement member, and the fitting protrusions are fitted to the fitting grooves so that the reinforcement member is fitted to the groove.

13. The steering wheel as defined in claim 11, wherein the reinforcement member is fitted to the groove with an adhesive member interposed therebetween.

14. The steering wheel as defined in claim 1, wherein the groove is formed by fully cutting end portions of the second and first intermediate members and cutting a portion of an upper surface of the armature member in a traverse direction of the intermediate member.

15. The steering wheel as defined in claim 14, wherein a plurality of fitting grooves are formed in the groove, fitting protrusions press-fitted to the fitting grooves are formed on the reinforcement member, and the fitting protrusions are fitted to the fitting grooves so that the reinforcement member is fitted to the groove.

16. The steering wheel as defined in claim 14, wherein the reinforcement member is fitted to the groove with an adhesive member interposed therebetween.

17. A passenger vehicle comprising the steering wheel as defined in claim 1.

* * * * *